United States Patent [19]

DuBois

[11] Patent Number: 4,526,361
[45] Date of Patent: Jul. 2, 1985

[54] DOCUMENT TURNOVER DEVICE

[76] Inventor: R. Clark DuBois, 332 Wakeman Rd., Fairfield, Conn. 06430

[21] Appl. No.: 558,951

[22] Filed: Dec. 7, 1983

[51] Int. Cl.³ .............................................. B65H 29/00
[52] U.S. Cl. .................................... 271/186; 271/270
[58] Field of Search ................. 271/65, 186, 270, 202, 271/203, 242, 243

[56] References Cited

U.S. PATENT DOCUMENTS

| | | | |
|---|---|---|---|
| 3,199,864 | 8/1965 | Irvine | 271/270 |
| 3,227,444 | 1/1966 | Egan . | |
| 3,700,231 | 10/1972 | Aasen . | |
| 3,942,785 | 3/1976 | Stange . | |
| 3,944,212 | 3/1976 | Stange et al. . | |
| 3,966,194 | 6/1976 | Abbé | 271/186 |
| 4,113,244 | 9/1978 | Ruenzi . | |
| 4,359,217 | 11/1982 | Roller et al. . | |
| 4,365,889 | 12/1982 | Silverberg . | |
| 4,477,068 | 10/1984 | Arter | 271/186 |

Primary Examiner—Richard A. Schacher

[57] ABSTRACT

A document turnover device mounted on a copying apparatus adjacent an exit end thereof receives documents being fed through the copying apparatus by a document feeding mechanism and inverts them from a first orientation to the reverse orientation. A guide or deflector deflects the documents from the high speed discharge rollers of the document feeding mechanism to a slow speed turnover drive mechanism. The document turnover device allows the documents to be pushed through the drive mechanism at the higher speed and then decelerates the documents following their release from the discharge rollers for neat stacking upon the cover of the copying apparatus.

23 Claims, 7 Drawing Figures

DOCUMENT TURNOVER DEVICE

BACKGROUND OF THE INVENTION

The present invention relates generally to a document turnover device, and more particularly to a document turnover device for inverting documents being fed through the copying apparatus.

Many copying apparatus have semi-automatic and/or automatic document feeding devices which provide a quick and efficient means for feeding documents one sheet at a time through the copying station to be copied. However, because the copied documents are generally stacked face down in the exit tray of the copying apparatus and the resulting copies are stacked face up in the copy tray, the orders of the two stacks are reversed and one of the stacks must be completely reorganized to obtain the original document sequence. Since this procedure causes considerable delay, it would be desirable to have the documents and copies automatically stacked in the same order.

It is an object of the present invention to provide a novel document turnover device to receive documents being fed through the discharge end of the copying apparatus and invert them into the reverse orientation.

It is also an object to provide such a device which reverses documents being discharged at a high rate of speed from the copying apparatus and decelerates them to permit neat stacking.

It is still another object to provide such a device which permits easy clearance of document jams and avoids damage to the documents being copied.

It is a further object to provide such a document turnover device which may be readily fabricated and will enjoy long life in operation.

SUMMARY OF THE INVENTION

It has now been found that the foregoing and related objects can be readily attained in a document turnover device used in combination with a copying apparatus or the like. The copying apparatus has a document feeding mechanism including a discharge means for moving the documents being copied in a first orientation through an exit end of the document feeding mechanism. The document turnover device includes a housing on the copying apparatus adjacent the exit end of the document feeding mechanism, deflecting means on the housing to deflect and guide a document exiting from the exit end of the document feeding mechanism in a document feed path from the first orientation to its reverse orientation, and turnover drive means in the housing for capturing the document in the document feed path while the document is still engaged by the discharge means of the document feeding mechanism and for driving the document after the document is released from the discharge means. The turnover drive means includes a roller means rotatably mounted relative to the housing and nip forming means cooperating with the roller means to form a nip in the document feed path defined by the deflecting means. The document turnover device further including a motor means on the housing rotating the roller means, circuit means for the motor means electrically connected to the associated copying apparatus for supply of power to the motor means concurrently with the operation of the document feeding mechanism, and means associated with the turnover drive means controlling forces on a document in the nip to allow a document to be driven faster by the discharge means of the document feeding mechanism by the turnover drive means.

In the preferred embodiment, the nip forming means includes a pair of nip forming members pivotally mounted with respect to the housing and having their outer ends disposed against the roller means. The associated means for controlling forces in the nip includes means to bias the nip forming members with a force normal to the document feed path whereby forces acting on a document in the nip will allow the document to be driven through the nip by the discharge means of the associated document feed mechanism at a rate faster than the drive rate of the turnover drive means.

Desirably, the motor includes a flywheel on its shaft adapted for continued rotation after the supply of power to the motor is disconnected. An operative driving connection, including a friction drive wheel on one end of the roller means, links the motor means and the roller means. The motor means is pivotally secured to the housing and biased by the force of gravity whereby its shaft is in operative contact with the friction drive wheel.

Ideally, the deflecting means is mounted within a pivotally mounted cover of the housing. The deflecting means is provided with a concave surface extending from a first end adjacent the discharge means of the associated document feeding mechanism to a second end adjacent the turnover drive means.

Conveniently, the housing has a pair of side plates and the roller includes a pair of rollers mounted on the shaft rotatably mounted in the pair of side plates. The housing also includes an enclosure at one end thereof for enclosing the motor means.

In a second embodiment, the associated means for controlling forces in the nip includes a clutch means operatively connected with the roller means of the turnover drive means. The roller means of the second embodiment has a pair of rollers fixedly mounted on a shaft rotatably mounted in the housing and the clutch is mounted on the shaft to allow the rollers and shaft to be driven faster by a document in the nip driven by the discharge means.

The invention will be fully understood when reference is made to the following detailed description taken in conjunction with the accompanying drawings.

DETAILED DESCRIPTION OF THE PREFERRED EMBODIMENTS

Figure 1:
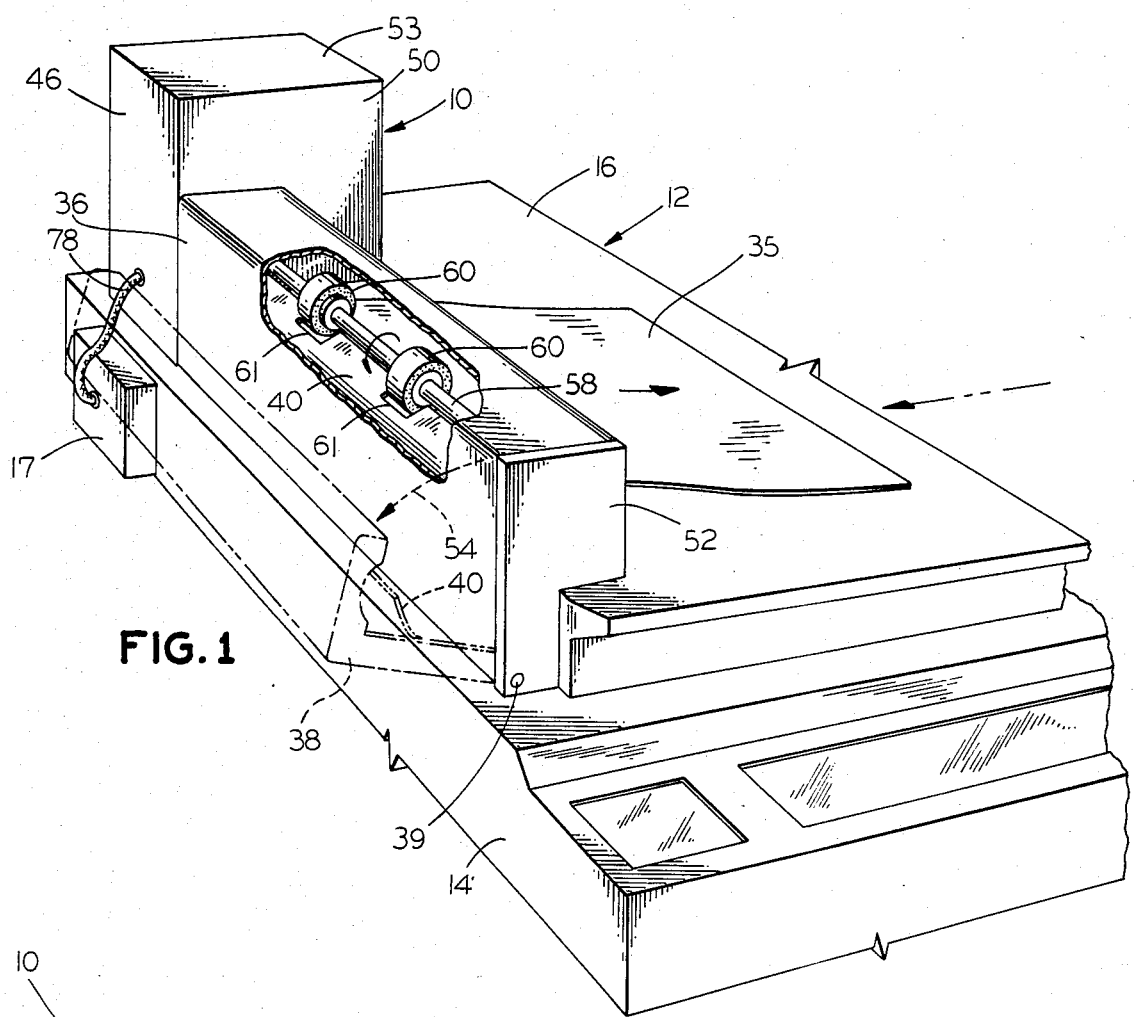
FIG. 1 is a fragmentary perspective view of the document turnover device embodying the present invention as mounted upon a copying apparatus, a portion of the housing of the turnover device, having been broken away for clarity of illustration and with the cover shown in phantom line in its open position.

Referring first to FIG. 1, therein is illustrated a document turnover device embodying the present invention and generally designated by the numeral 10 as mounted on a conventional copying apparatus generally designated by the numeral 12. The copying apparatus 12 has a main housing 14 with a pivotally mounted cover 16 thereon. The housing 14 contains a copying station 15 under the cover 16 and a control circuit 17 to reproduce documents on copier sheet material (not shown) as the documents are fed through the copying apparatus 12 in a face down orientation.

Figure 2:
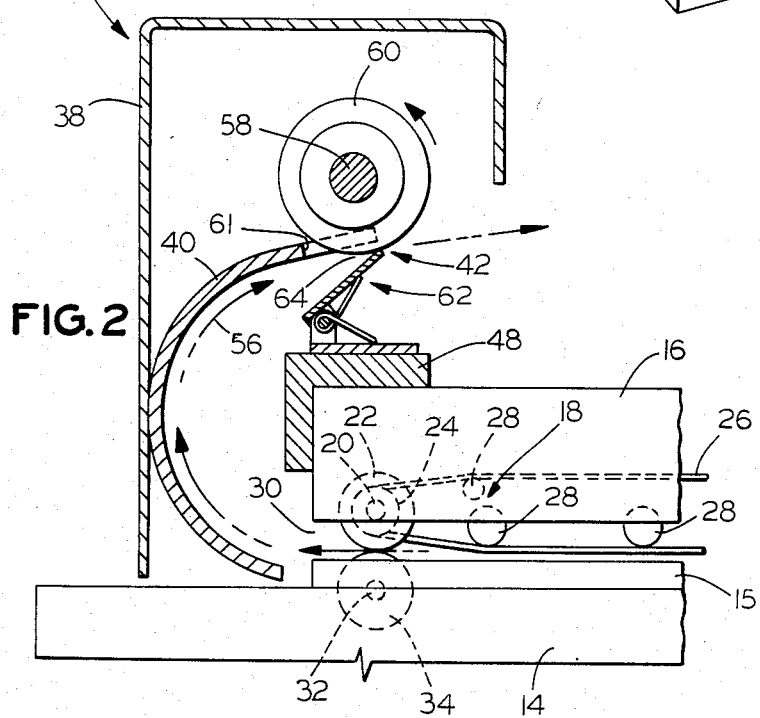
FIG. 2 is a fragmentary right side elevational view of the document turnover device and copying apparatus with the housing and deflector of the turnover device in section to illustrate the internal components and the feed path.

As seen in FIG. 2, the cover 16 of the copying apparatus 12 contains a document feeding mechanism generally designated by the numeral 18 and comprising a shaft 20 having a plurality of discharge rollers 22 and belt drive pulleys 24 spaced axially therealong and mounted for rotation therewith. The shaft 20 is journalled in the cover 16 and rotatably driven by a drive motor (not shown) controlled by the copier control circuit 17. Flexible belts 26 extend about the drive pulleys 24 and the idler pulleys 28 in an endless path to advance documents through the copying apparatus to an exit or outlet end 30 of the document feed mechanism 18. The exit end 30 is defined by the spaced relationship between the main housing 14 and cover 16. The control circuit 17 has a document sensing switch or a timing device (not shown) to deactivate the drive motor as the trailing end of the document leaves the exit end 30 of the document feed mechanism 18.

In the main housing 14 of the copying apparatus 12 is a shaft 32 with a plurality of lower discharge rollers 34 rotatably mounted thereon. These rollers 34 cooperate with the upper driven discharge rollers 22 to push the document being copied through the exit end 30 of the document feed mechanism 18.

The document turnover device 10 for depositing a document 35 in a face up orientation on the cover 16 has a housing 36 mounted on the cover 16 of the copying apparatus 12 adjacent the exit end 30 thereof. The housing 36 includes a cover 38 pivotably supported on the pivot pins 39 and a concave document deflector or guide 40 mounted in the cover 38 for receiving and deflecting a document as the discharge rollers 22, 34 push it out the exit end 30. Mounted in the housing 36 adjacent the upper end of the deflector 40 is a turnover drive mechanism generally designated by the numeral 42 which grips the document while it is still engaged by the discharge rollers 22, 34 of the document feeding mechanism 18 and thereafter drives the document after the document is released from the discharge rollers 22, 34. The turnover device 10 also includes a motor drive 44 located in the side enclosure 46 of the housing 14 for driving the turnover drive mechanism 42.

As best seen in FIGS. 1 and 2, an angle bracket 48, extends along the end and top surfaces of cover 16, and left and right side plates 50, 52 are attached to its ends. The left side plate 50 cooperates with a cover 53 at the end of the housing 36 to form the enclosure 46 for the motor drive 44.

As previously indicated, the cover 38 is pivotally mounted on the lower ends of the side plates 50, 52 by the pivot pins 39 for pivotal movement as indicated by arrow 54 in FIG. 1 from a closed position shown in solid line to an open position shown in phantom line for clearing document jams. In the closed, operative position, the concave surface of the deflector 40 will intercept and guide the document being copied along a feed path indicated in FIG. 2 by numeral 56 from the discharge rollers 22, 34 to the turnover drive mechanism 42.

The turnover drive mechanism 42 includes a roller shaft 58 which extends between and is journalled for rotation in the side plates 50, 52 and which has a pair of feed rollers 60 mounted thereon for rotation therewith. It should be noted that the peripheral portions of the rollers 60 extend within a pair of notches 61 formed in the upper end of the deflector 40. A pair of upwardly extending, nip forming pivot finger assemblies generally designated by the numeral 62 are supported in spaced apart relationship on angle bracket 48 and cooperate with the feed rollers 60 to form nips 64 in the portion of the document feed path 56 defined by the upper end of the deflector 40.

Figure 4:
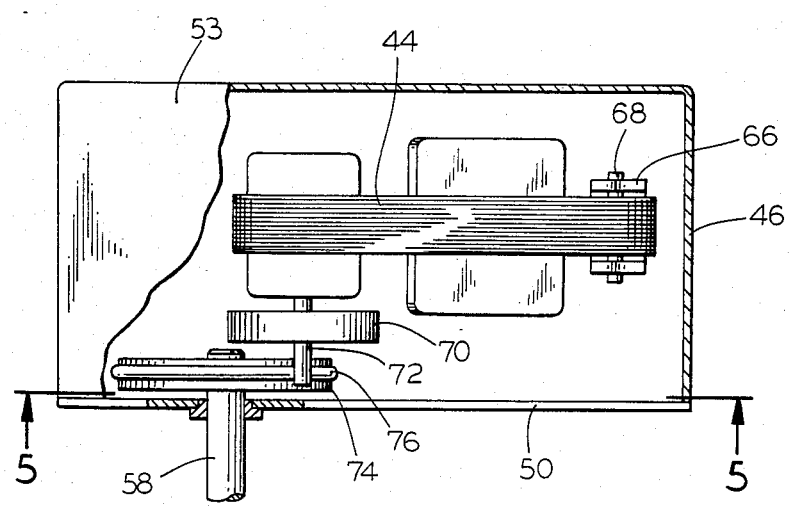
FIG. 4 is a fragmentary top elevational view of the document turnover device with a portion of the housing broken away to show internal components.
Figure 5:
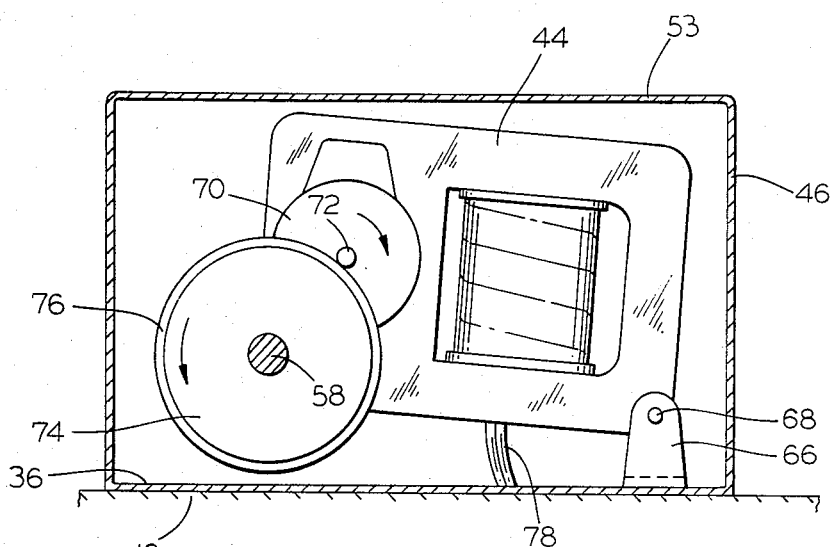
FIG. 5 is a fragmentary sectional view taken along the 5—5 line in FIG. 4.

Referring now to FIGS. 4 and 5, the motor drive 44 for rotating the roller shaft 58 is pivotally mounted on the housing 36 by bracket 66 and pivot pin 68. The motor 44 has a shaft 72 upon which is mounted a flywheel 70 and which has its end rotating against the high friction rubber O-ring 76 on the friction drive wheel 74 on the roller shaft 58. Thus, it will be appreciated that motor 44 and its shaft 72 are pivoted around pivot pin 68 by gravity into the position shown in FIGS. 4 and 5 to frictionally engage with the high friction rubber O-ring 76 of the friction wheel 74 to impart rotation thereto.

The motor 44 receives electrical power through the electrical conduit 78 which is connected to the control circuit 17 of the copying apparatus for supplying electrical power to the motor 44 to operate the motor 44 concurrently with the operation of the document feeding mechanism 18. However, the surface speed of the rollers 60 when driven by motor 44 is substantially slower than the surface speed of the discharge rollers 22, 34, for reasons to be explained hereinafter.

Figure 3:
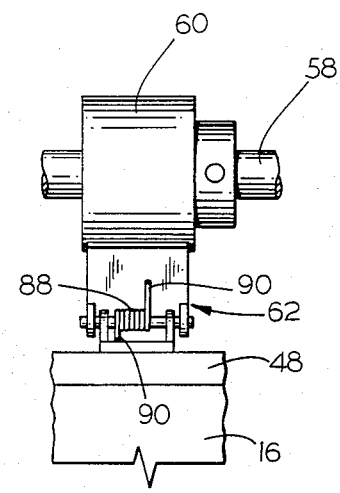
FIG. 3 is a fragmentary rear elevational view of the document turnover device with the housing removed to show one of the rollers and nip forming finger assemblies.
Figure 6:
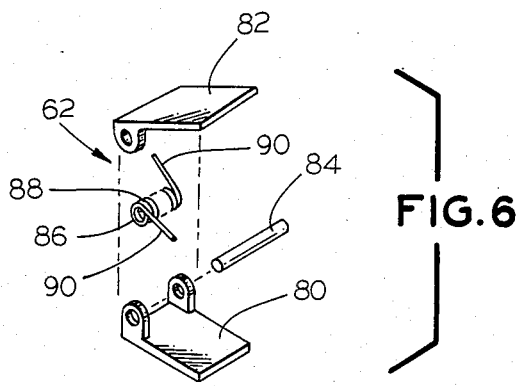
FIG. 6 is an exploded view of one of the nip forming finger assemblies of the present invention.

As best seen in FIG. 6, each pivot finger assembly 62 has a base member 80 with brackets at one end thereof which seat a pivot pin 84 and thereby pivotally mount the nip forming member 82. As seen in FIGS. 2 and 3, each finger assembly 62 is provided with a coiled spring 86 having a body 88 which surrounds the pivot pin 84 and a pair of extending legs 90 for biasing the nip forming member 82 around the pivot pin 84 and against the associated roller 60. The amount of total spring force or pressure exerted by the coil spring 86 on the finger 62 is relatively small, generally on the order of approximately ten grams. Thus, the document captured within the nips 64 of the turnover drive mechanism 42 will be held against the rollers 60 by the equivalent, relatively light force.

During a copying operation or sequence, a document is fed in a face down orientation to the copying station 15 of the copying apparatus 12 by the belts 26 powered by the associated drive motor. After the copying operation has been completed, the belts 26 advance the document to the discharge rollers 22, 34. Meanwhile, the motor 44, and thereby the drive mechanism 42 of the turnover device 10, being powered through electrical conduit 78 operates concurrently with the document feeding mechanism 18.

The discharge rollers 22, 34 advance the document through the exit end 30 against the deflector 40 which deflects it upwardly and reverses it in the document feed path 56. Thereafter, the document is captured in the nips 64 defined by the rollers 60 and finger assemblies 62. However, since the document is still being driven by discharge rollers 22 at more than twice the surface speed of rollers 60, the document will exert a force on the finger assemblies 62 against the weak biasing force provided by the associated springs 86. In response to this exerted force, the nip forming members 82 pivot downwardly around pivot pins 84 to permit the document to slide through the nips 64 at the faster speed until the document is released from the nips between the discharge rollers 22, 34.

Following this release of the document, the document sensing switch (not shown) deactivates the document feeding mechanism 18 of the copying apparatus 12, thereby deactivating the motor 44 of the turnover device 10. However, the angular momentum of the flywheel 70 continues to rotate the motor shaft 72, which rotates the shaft 58 and the rollers 60.

The document no longer exerts a downward force on the finger assemblies 62 as it decelerates to the surface speed of rollers 60 which are being driven by the flywheel 70 and cooperate with the finger assemblies 62 to gently advance or push the document 35 in a face up orientation onto the cover 16 of the copying apparatus 12. Documents subsequently fed through the copying apparatus 12 and turnover device 10 will neatly stack atop document 35.

Figure 7:
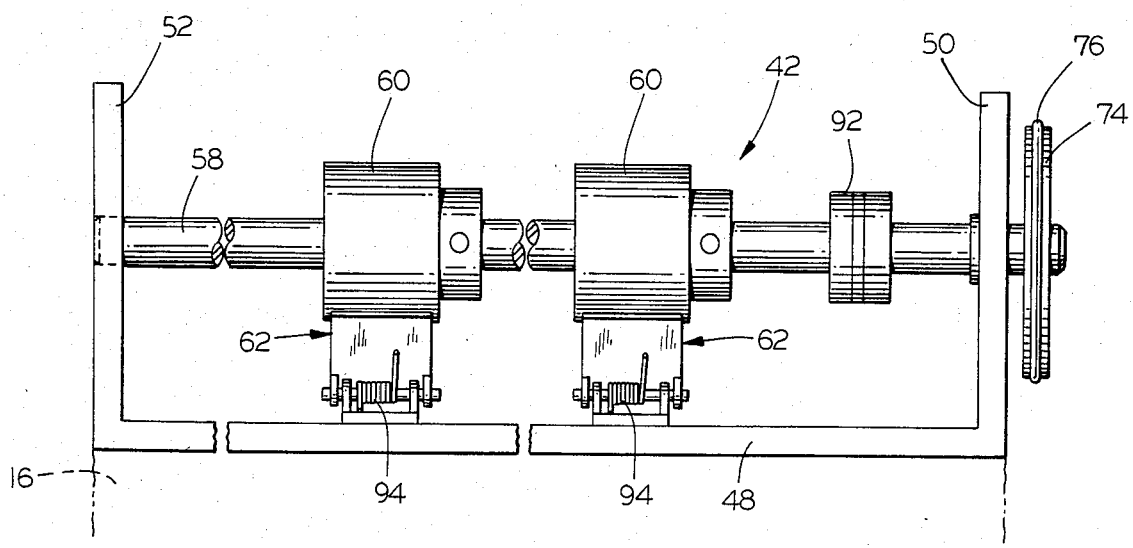
FIG. 7 is a fragmentary rear elevational view of another embodiment of the turnover device of the present invention having the cover removed for clarity of illustration.

A second embodiment of the document turnover device of the present invention is illustrated in FIG. 7 wherein like numerals designate like parts. A slip clutch mechanism 92 (which may be a magnetic, fluid or friction clutch) interrupts the shaft 58 between the feed rollers 60 of the turnover drive mechanism 42 and the friction drive wheel 74. The coil springs 94 in the finger assemblies 62 provide a biasing force in a manner similarly to springs 86 of the first embodiment, but the springs 94 exhibit a much greater spring constant than the springs 86. As a result, the nip forming members 82 biased by the springs 94 will not deflect to any great extent when a document is being driven by discharge rollers 22, 34 and is captured in the nips 64 defined by rollers 60 and finger assemblies 62.

In operation, the second embodiment of the document turnover device 10 receives a document from the discharge rollers 22, 34 of the document feed mechanism 18. The document is fed along the document feed path 56 defined by deflector 40 at a speed greater than the surface speed of the rollers 60. As the document enters the nips 64, the force exerted by the document on rollers 60 will cause the clutch 92 to slip and allow the lefthand portion of shaft 58 and the rollers 60 to freewheel as they are driven by the document. When the trailing end of the document leaves the nips defined by the discharge rollers 22, 34, the document decelerates allowing the clutch 92 to reengage and drive the document by utilizing the angular momentum of the flywheel 70 as previously described with reference to the first embodiment to deposit the document on the cover 16.

The turnover housing can be releasably fastened on the cover by conventional fastening elements, including sheet metal screws, machine screws and cooperating nuts and adhesives. The housing can also be formed as an integral part of the cover.

The nip forming fingers can take various forms including an arcuately shaped nip forming member having an outer surface with a radius of curvature substantially the same as that of the upper feed rollers. In the second embodiment of FIG. 7, the fingers may be replaced by rollers.

It should be understood that the feature of the present invention which allows the fast forward feed of the documents through the turnover drive mechanism can be accomplished by utilizing a low torque drive connection between the roller shaft and the drive motor. For example, the high friction rubber O-ring and clutch mechanism of the second embodiment of the present invention may be replaced by a highly polished, low friction plastic O-ring. Slippage between the plastic O-ring and the motor shaft, when a document is being driven at the higher speed in the nips, would allow the shaft and the rollers to be driven thereby.

Thus, it can be seen from the foregoing detailed specification and accompanying drawings that the efficiency of the copying apparatus and operator thereof is greatly increased by the provision of the novel document turnover device of the present invention. The turnover device readily accepts documents being moved from the copying apparatus at high rates of speed and decelerates them for neat stacking on the cover of the copying apparatus. Further, document jams are easily cleared by pivoting the turnover cover to its open position.

Having thus described the invention, I claim:

1. A document turnover device for use in combination with a copying apparatus or the like having a document feeding mechanism for the documents being copied including a discharge means for moving the document being copied in a first orientation through the exit end of the document feeding mechanism, comprising:
   A. a housing adapted to be mounted on the associated copying apparatus adjacent the exit end of the its document feeding mechanism;
   B. deflecting means on said housing to deflect and guide a document exiting from the exit end of the associated document feeding mechanism in a document feed path from the first orientation to its reverse orientation;
   C. turnover drive means in said housing for capturing the document in said document feed path while the document still is engaged by the discharge means of the associated document feeding mechanism and for driving the document after the document is released from the discharge means of the associated document feeding mechanism, said turnover drive means including a roller means rotatably mounted relative to said housing and nip forming means cooperating with said roller means to form a nip in said document feed path defined by said deflecting means;
   D. motor means on said housing for rotating said roller means;
   E. circuit means for said motor means adapted to be electrically connected to the associated copying apparatus for supply of power to said motor means concurrently with operation of the associated document feeding mechanism; and
   F. means associated with said turnover drive means controlling forces acting on a document in said nip to allow a document to be driven faster by the discharge means of the associated document feeding mechanism than by said turnover drive means.

2. The document turnover device in accordance with claim 1 wherein said deflecting means is provided with a concave surface extending from a first end adjacent the discharge means of the associated document feed mechanism to a second end adjacent said turnover drive means.

3. The document turnover device in accordance with claim 1 wherein said nip forming means includes a pair of nip forming finger members pivotally mounted with respect to said housing and having their outer ends disposed against said roller means.

4. The document turnover device in accordance with claim 3 wherein said associated means for controlling forces in said nip includes means to bias said nip forming finger members with a force normal to said document feed path, whereby forces acting on a document in said nip will allow the document to be driven through said nip by the discharge means of the associated document feed mechanism at a rate faster than the drive rate of said turnover drive means.

5. The document turnover device in accordance with claim 1 wherein said motor means includes a flywheel on the shaft of a motor for continued rotation of the shaft after the supply of power to said motor means from the associated copying apparatus is discontinued.

6. The document turnover device in accordance with claim 5 further including an operative driving connection between said motor means and roller means including a friction drive wheel on one end of said roller means operatively engaged with said motor shaft of said motor means for movement therewith.

7. The document turnover device in accordance with claim 6 wherein said motor means is pivotally secured to said housing at one end thereof, said motor shaft of said motor means being biased by the force of gravity on said motor means into operative contact with said friction drive wheel of said operative connection.

8. The document turnover device in accordance with claim 1 wherein said associated means for controlling forces in said nip includes clutch means operatively connected between said motor means and said roller means of said turnover drive means.

9. The document turnover device in accordance with claim 8 wherein said roller means has a pair of rollers fixedly mounted on a shaft rotatably mounted in said housing and said clutch means is mounted on said shaft to allow said rollers and shaft to be driven faster by a document in said nip driven by the discharge means.

10. The document turnover device in accordance with claim 1 wherein said housing has a pair of side plates located at either end thereof and said roller means includes a pair of rollers mounted on a shaft rotatably mounted in said pair of side plates.

11. The document turnover device in accordance with claim 1 wherein said housing includes an enclosure at one end thereof enclosing said motor means.

12. The document turnover device in accordance with claim 1 wherein said housing includes a cover pivotally mounted for movement between a closed position and an open position for clearing document jams.

13. The document turnover device in accordance with claim 12 wherein said deflecting means is mounted within said pivotally mounted cover, whereby said deflecting means can deflect and guide a document in said document feed path when said cover is in said closed position.

14. The document turnover device in accordance with claim 1 wherein said roller means includes a pair of rollers fixedly mounted on a shaft rotatably mounted in said housing.

15. A copying apparatus or the like for making copies of documents in combination with a document turnover device, comprising:
  A. a copying apparatus having a document feeding mechanism for the documents being copied including a discharge means for moving the document being copied in a first orientation through an exit end of said document feeding mechanism; and
  B. a document turnover device including:
    i. a housing on said copying apparatus adjacent said exit end of said document feeding mechanism;
    ii. deflecting means on said housing to deflect and guide a document exiting from said exit end of said document feeding mechanism in a document feed path from the first orientation to its reverse orientation;
    iii. turnover drive means in said housing for capturing the document in said document feed path while the document still is engaged by said discharge means of said document feeding mechanism and for driving the document after the document is released from said discharge means of said document feeding mechanism, said turnover drive means including a roller means rotatably mounted relative to said housing and nip forming means cooperating with said roller means to form a nip in said document feed path defined by said deflecting means;
    iv. motor means on said housing for rotating said roller means;
    v. circuit means for said motor means electrically connected to said associated copying apparatus for supply of power to said motor means concurrently with operation of said document feeding mechanism; and
    vi. means associated with said turnover drive means controlling forces on a document in said nip to allow a document to be driven faster by said discharge means of said document feeding mechanism than by said turnover drive means.

16. The combination in accordance with claim 15 wherein said deflecting means is provided with a concave surface extending from a first lower end adjacent said discharge means of said associated document feed mechanism to a second upper end adjacent said turnover drive means.

17. The combination in accordance with claim 15 wherein said nip forming means includes a pair of nip forming members pivotally mounted with respect to said housing and having their outer ends disposed against said roller means.

18. The combination in accordance with claim 17 wherein said associated means for controlling forces in said nip includes means to bias said nip forming members with a force normal to said document feed path, whereby forces acting on a document in said nip will allow the document to be driven through said nip by said discharge means of said associated document feed mechanism at a rate faster than the drive rate of said turnover drive means.

19. The combination in accordance with claim 15 wherein said motor means includes a flywheel on the shaft of a motor adapted for continued rotation of the motor shaft after the supply of power to said motor means from said associated copying apparatus is discontinued.

20. The combination in accordance with claim 19 further including an operative driving connection between said motor means and roller means including a friction drive wheel on one end of said roller means operatively engaged with said motor shaft of said motor means for movement therewith.

21. The combination in accordance with claim 20 wherein said motor means is pivotally secured to said housing at one end thereof, whereby said motor shaft of said motor means being biased by the force of gravity on said motor means into operative contact with said friction drive wheel of said operative connection.

22. The combination in accordance with claim 15 wherein said associated means for controlling forces in said nip includes clutch means operatively connected with said roller means of said turnover drive means.

23. The combination in accordance with claim 22 wherein said roller means has a pair of rollers fixedly mounted on a shaft rotatably mounted in said housing and said clutch means is mounted on said shaft to allow said rollers and shaft to be driven faster by a document in said nip driven by said discharge means.

* * * * *